United States Patent
Yabuki et al.

(10) Patent No.: US 10,450,471 B2
(45) Date of Patent: Oct. 22, 2019

(54) METHOD FOR PRODUCING HEAT-RAY SHIELDING DISPERSION BODY, HEAT-RAY SHIELDING DISPERSION BODY, AND HEAT-RAY SHIELDING BODY

(71) Applicant: SUMITOMO METAL MINING CO., LTD., Tokyo (JP)

(72) Inventors: Kayo Yabuki, Ichikawa (JP); Atsushi Tofuku, Ichikawa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 970 days.

(21) Appl. No.: 14/414,365

(22) PCT Filed: Jul. 11, 2013

(86) PCT No.: PCT/JP2013/069011
§ 371 (c)(1),
(2) Date: Jan. 12, 2015

(87) PCT Pub. No.: WO2014/010684
PCT Pub. Date: Jan. 16, 2014

(65) Prior Publication Data
US 2015/0197646 A1    Jul. 16, 2015

(30) Foreign Application Priority Data
Jul. 11, 2012    (JP) .................. 2012-155150

(51) Int. Cl.
*C09D 5/32*     (2006.01)
*C08J 5/18*     (2006.01)
(Continued)

(52) U.S. Cl.
CPC ..................... *C09D 5/32* (2013.01); *C08J 5/18* (2013.01); *C09D 1/00* (2013.01); *C09D 5/004* (2013.01); *C09D 169/00* (2013.01)

(58) Field of Classification Search
None
See application file for complete search history.

(56) References Cited

U.S. PATENT DOCUMENTS

| 6,773,803 B2* | 8/2004 | Lee ................ A01N 59/06 428/323 |
| 2010/0220388 A1* | 9/2010 | Suzuki ............ B32B 17/10 359/359 |
| 2011/0091708 A1* | 4/2011 | Noda .............. C08F 297/04 428/220 |

FOREIGN PATENT DOCUMENTS

| JP | H0812378 A | 1/1996 |
| JP | H0859300 A | 3/1996 |

(Continued)

OTHER PUBLICATIONS

The Editors of Encyclopaedia Britannica (2017). Thermal radiation. In Encyclopaedia Britannica. Retrieved May 3, 2018 from https://www.britannica.com. (Year: 2017).*

(Continued)

*Primary Examiner* — Ronak C Patel
*Assistant Examiner* — Thomas A Mangohig
(74) *Attorney, Agent, or Firm* — Oliff PLC

(57) ABSTRACT

There is provided a method for producing a heat-ray shielding dispersion body in which heat-ray shielding particles having an excellent hygrothermal resistance are dispersed in a medium, a heat-ray shielding body, and a method for producing them. The heat-ray shielding dispersion body and the heat shielding body are produced by mixing and dispersing zinc hydroxide particles and composite tungsten oxide particles expressed by a general formula $M_Y WO_Z$ and having a hexagonal crystal structure, and molding and solidifying such a dispersion.

13 Claims, 1 Drawing Sheet

(51) Int. Cl.
*C09D 169/00* (2006.01)
*C09D 1/00* (2006.01)
*C09D 5/33* (2006.01)

(56) References Cited

FOREIGN PATENT DOCUMENTS

| | | | |
|---|---|---|---|
| JP | H0873223 | A | 3/1996 |
| JP | H08283044 | A | 10/1996 |
| JP | H09127559 | A | 5/1997 |
| JP | 2000119045 | A | 4/2000 |
| JP | 2003121884 | A | 4/2003 |
| JP | 4096205 | B2 | 6/2008 |
| JP | 2010163574 | A | 7/2010 |
| JP | 2011063739 | A | 3/2011 |
| JP | 2011133586 | A | 7/2011 |
| JP | 2011157504 | A | 8/2011 |
| JP | 2012229388 | A | 11/2012 |

OTHER PUBLICATIONS

Oct. 15, 2013 Search Report issued in International Application No. PCT/JP2013/069011.

* cited by examiner (A)
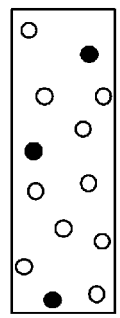
(B)
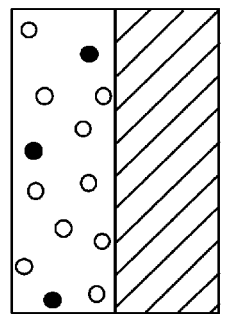   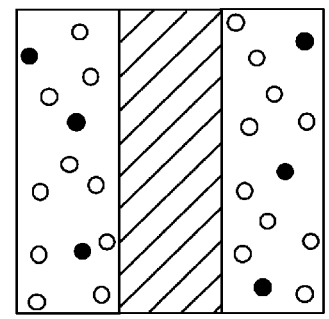
○: composite tungsten oxide particles
●: zinc hydroxide particles
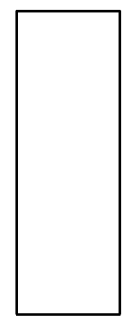   
MEDIUM   BASE MATERIAL

METHOD FOR PRODUCING HEAT-RAY SHIELDING DISPERSION BODY, HEAT-RAY SHIELDING DISPERSION BODY, AND HEAT-RAY SHIELDING BODY

TECHNICAL FIELD

The present invention relates to a heat-ray shielding dispersion body and a heat-ray shielding body capable of transmitting alight of a visible light region and using a near-infrared shielding material having absorption in a near-infrared region, and a method for producing them.

DESCRIPTION OF RELATED ART

A solar light is roughly divided into a near-infrared light (heat ray), a visible light, and a UV-light. The near-infrared light (heat ray) has a wavelength region felt by a human body as a thermal energy, and causes a summer temperature rise in a room. Further, the UV-light is indicated to have an adverse influence on the human body, such as a sunburn and skin cancer, etc. In recent years, in order to shield the near-infrared light as a heat ray, keep heat, and have an insulation performance, transparent substrates such as glass, polycarbonate resin, and acrylic resin, etc., are required to have a near-infrared absorption power.

Patent document 1 discloses a heat radiation-insulating glass capable of suitably being used for a part for which high visible ray transmittance and good heat radiation insulating glass are required, which is obtained by forming a complex oxide tungsten film 2 containing at least one kind metal ion selected from a group consisting of groups IIIa, IVa, Vb, VIb and VIIb of the periodic table as the first layer from substrate side on a transparent glass substrate, forming a transparent dielectric film 3 as the second layer on the first layer 2, forming a complex oxide tungsten film 4 containing at least one kind metal ion selected from a group consisting of groups of IIIa, IVa, Vb, VIb and VIIb of the periodic table as the third layer on the second layer 3 and setting refractive index of a transparent dielectric substance of the second layer 3 in a lower value than that of the complex oxide tungsten film of the first layer 2 and the third layer 4.

Further, patent document 2 discloses a heat ray cut-off glass by laminating a 1st dielectric film on a glass substrate as a 1st layer from the substrate side, a tungsten oxide film thereon as a 2nd layer and a 2nd dielectric film further thereon as a 3rd layer.

Further, patent document 3 discloses a heat ray shielding glass provided with a composite tungsten oxide film containing a similar metal element as a first layer from a substrate 1 side on the transparent substrate and a transparent dielectric film as a second layer on the first layer.

Further, patent document 4 discloses a solar light control glass having a solar light shielding property, which is formed coating the glass sheet with a metal oxide film containing added elements such as hydrogen, lithium, sodium, and potassium, etc., and made of a metal selected from one kind or more of tungsten trioxide ($WO_3$), molybdenum trioxide ($MoO_3$), niobium pentaoxide ($Nb_2O_5$), tantalum pentaoxide ($Ta_2O_5$), vanadium pentaoxide ($V_2O_5$) and vanadium dioxide ($VO_2$), using a CVD method or a spray method, and causing a thermal decomposition at about 250° C.

Patent document 5 discloses a solar light variable light controllable thermally insulation material capable of shielding a near-infrared light of the solar light in which coloring and decoloring reactions to the solar light are fast and an absorption peak appears in a wavelength of 1250 nm in a near-infrared region at the time of coloring, using the following property of tungsten oxide: the tungsten oxide is obtained by hydrolyzing tungstic acid, and an organic polymer having a specific structure of polyvinyl pyrrolidone, is added to the tungsten oxide so that UV-ray in a light beam is absorbed in the tungsten oxide when it is irradiated with the solar light and excited electrons and holes are generated, and appearance of pentavalent tungsten is remarkably increased by a small amount of UV-rays, to thereby accelerate the coloring reaction, and along with the accelerated coloring reaction, a coloring concentration is also increased, and by blocking light, the pentavalent tungsten is extremely speedily oxidized to hexavalent tungsten, and the decoloring reaction becomes fast.

Further, patent document 6 discloses as follows: tungsten hexachloride is dissolved in alcohol, and the solvent is evaporated as it is or the solvent is evaporated after reflux and thereafter heated at 100° C. to 500° C., to thereby obtain powder composed of tungsten trioxide or its hydrate or a mixture of them, obtain an electrochromic element using the tungsten oxide particle, and change the optical property of a film when a multilayer lamination body is constituted and proton is introduced into the film.

Further, patent document 7 discloses a method of preparing various tungsten bronze expressed by $MxWO_3$ (M; metal elements such as alkali Ia group, IIa group, rare earth elements, satisfying $0<x<1$), by using meta-type ammonium tungstate and each kind of aqueous metal salts as raw materials, and supplying a hydrogen gas added with an inert gas (addition amount; about 50 vol % or more) or steam (addition amount; about 15 vol % or less), to dryness of the aqueous mixture while heating it at about 300 to 700° C.

Further, patent document 8 discloses a near-infrared ray shielding particle dispersion body obtained by dispersing near-infrared ray shielding particles composed of tungsten oxide particles and/or composite tungsten oxide particles, in a medium such as resin or glass, etc., a near-infrared ray shielding body produced from the dispersion body, a method for producing the near-infrared ray shielding particles, and near-infrared ray shielding particles.

PRIOR ART DOCUMENT

Patent Document

Patent document 1: Japanese Patent Laid Open Publication No. 1996-59300
Patent document 2: Japanese Patent Laid Open Publication No. 1996-12378
Patent document 3: Japanese Patent Laid Open Publication No. 1996-283044
Patent document 4: Japanese Patent Laid Open Publication No. 2000-119045
Patent document 5: Japanese Patent Laid Open Publication No. 1997-127559
Patent document 6: Japanese Patent Laid Open Publication No. 2003-121884
Patent document 7: Japanese Patent Laid Open Publication No. 1996-73223
Patent document 8: U.S. Pat. No. 4,096,205

SUMMARY OF THE INVENTION

Problem to be Solved by the Invention

According to an examination by inventors of the present invention, the near-infrared ray shielding body (heat-ray shielding glass) described in patent documents 1 to 3 is manufactured by a method using a dry process based on vacuum film deposition methods mainly such as sputtering, evaporation, ion plating, and chemical vapor deposition (CVD). Therefore, there is a problem that a large manufacturing device is required, thus incurring a high manufacturing cost, and it is also manufactured by the abovementioned vacuum film deposition methods, and therefore a base material of the substrate of the shielding body is exposed to plasma at a high temperature or heating is required after film deposition. Therefore, when resin such as a film, etc., is used for the base material instead of glass, examination is required separately regarding a facility and a film depositing condition.

Further, the near-infrared ray shielding body (solar light controllable glass sheet) of patent document 4, is obtained by forming a coating film of a metal oxide which is a raw material on a glass using the CVD method or using the spray method and the thermal decomposition method together. However, the raw material as a precursor requires a high cost, and is decomposed at a high temperature, and therefore when the resin such as a film is used for the base material instead of the glass sheet, examination is required separately regarding the film depositing condition.

Further, the solar light variable light controllable thermally insulation material of patent document 5 and the electrochromic element of patent document 6 are materials for changing a color tone by UV-ray or a potential difference, thus involving a problem that a film structure is complicated, and it is difficult to be used in a field where the change of a color tone is not desired.

Further, patent document 7 describes a method for preparing tungsten bronze, but does not describe at all regarding a particle size and optical properties of the obtained powder. Probably this is because electrode materials of electrolyzers and fuel cells and catalyst materials of organic synthesis are considered as the purpose of use of the tungsten bronze, and the purpose of use of the abovementioned near-infrared ray shielding body is not considered.

Meanwhile, patent document 8 teaches the tungsten oxide particles and/or composite tungsten oxide particles used for manufacturing a near-infrared ray shielding body, and these oxide particles have excellent visible light transmittance and an excellent near-infrared ray shielding effect, and therefore attention is paid thereto as the near-infrared ray shielding body which is suitably used in the field of window materials, etc., of each kind of buildings and vehicles.

However, hygrothermal resistance of such composite tungsten oxide particles is not sufficiently satisfactory, and therefore there is still a room for improvement.

In view of the above-described problem, the present invention is provided, and an object of the present invention is to provide a heat-ray shielding dispersion body obtained by dispersing heat-ray shielding particles having excellent hygrothermal resistance in a medium, a heat-ray shielding body, and a method for manufacturing them.

Means for Solving the Problem

In order to solve the above-described problem, and as a result of strenuous efforts by inventors of the present invention, the following knowledge is obtained. Namely, by mixing zinc hydroxide particles into the composite tungsten oxide particles which is a near-infrared ray absorption material, the near-infrared ray absorption material can be produced, in which a maximum point of transmissivity is in a visible light region, a strong absorption point is in the near-infrared region, and an excellent hygrothermal resistance can be exhibited. The present invention is completed based on the abovementioned technical knowledge.

Namely, a first invention of the present invention provides a method for producing a heat-ray shielding dispersion body, including:

producing a composite tungsten oxide particle dispersion liquid in which composite tungsten oxide particles are dispersed in a dispersion medium, each particle being expressed by a general formula $M_YWO_Z$ ($0.001 \leq Y \leq 1.0$, $2.2 \leq Z \leq 3.0$) wherein element M is one or more kinds of Cs, Rb, K, Tl, and having a hexagonal crystal structure, with a particle size of 1 nm or more and 800 nm or less;

producing a zinc hydroxide particle dispersion liquid by dispersing zinc hydroxide in a dispersion medium, with a dispersed particle size of the zinc hydroxide set to 1 nm or more and 800 nm or less;

producing a first dispersed mixture liquid by adding and mixing the zinc hydroxide particle dispersion liquid into the composite tungsten oxide particle dispersion liquid, so that not less than 0.1 pts.wt. and not more than 100 pts.wt. of the zinc hydroxide particles are contained, based on 100 pts.wt. of the composite tungsten oxide particles; and producing a heat-ray shielding dispersion body by molding and solidifying the first dispersed mixture liquid.

A second invention provides the method for producing a heat-ray shielding dispersion body according to the first invention, including:

producing a dispersion powder by removing the dispersion medium from the first dispersed mixture liquid; and producing a second dispersed mixture by mixing and dispersing the dispersion powder in a specific medium; and producing a heat-ray shielding dispersion body by molding and solidifying the second dispersed mixture.

A third invention provides a method for producing a heat-ray shielding dispersion body, including:

producing a first dispersed mixture liquid in which composite tungsten oxide particles are dispersed in a dispersion medium, each particle being expressed by a general formula $M_YWO_Z$ ($0.001 \leq Y \leq 1.0$, $2.2 \leq Z \leq 3.0$) wherein element M is one or more kinds of Cs, Rb, K, Tl, having a hexagonal crystal structure, and also zinc hydroxide particles are dispersed therein, with a particle size of the composite tungsten oxide particles and the zinc hydroxide particles set to 1 nm or more and 800 nm or less, so that 0.1 pts.wt. or more and 100 pts.wt. or less of the zinc hydroxide particles are contained based on 100 pts.wt. of the composite tungsten oxide particles; and producing a heat-ray shielding dispersion body by molding and solidifying the first dispersed mixture liquid.

A fourth invention provides the method for producing a heat-ray shielding dispersion body according to the third invention, including:

producing a dispersion powder by removing the dispersion medium from the first dispersed mixture;

producing a second dispersed mixture by mixing and dispersing the dispersion powder in a specific medium; and producing a heat-ray shielding dispersion body by molding and solidifying the second dispersed mixture.

A fifth invention provides a method for producing a heat-ray shielding dispersion body, including:

producing a composite tungsten oxide particle dispersion liquid in which composite tungsten oxide particles are dispersed in a dispersion medium, each particle being expressed by a general formula $M_YWO_Z$ ($0.001 \leq Y \leq 1.0$, $2.2 \leq Z \leq 3.0$) wherein element M is one or more kinds of Cs, Rb, K, Tl, and having a hexagonal crystal structure, with a particle size of 1 nm or more and 800 nm or less;

producing a composite tungsten oxide particle dispersion powder by removing the dispersion medium from the first composite tungsten oxide particle dispersion liquid;

producing a second composite tungsten oxide particle dispersion by mixing and dispersing the composite tungsten oxide particle dispersion powder in a specific medium;

producing a first zinc hydroxide particle dispersion liquid by dispersing zinc hydroxide in a dispersion medium, with a dispersed particle size of the zinc hydroxide set to 1 nm or more and 800 nm or less, and producing a zinc hydroxide particle dispersion powder by removing the dispersion medium from the dispersion liquid of the first zinc hydroxide particle dispersion liquid;

producing a second zinc hydroxide particle dispersion by mixing and dispersing the zinc hydroxide particle dispersion powder in a specific medium; and producing a heat-ray shielding dispersion body by mixing the second composite tungsten oxide particle dispersion and the second zinc hydroxide particle dispersion, and molding and solidifying them.

A sixth invention provides a heat-ray shielding dispersion body, which is produced by the method for producing a heat-ray shielding dispersion body according to any one of the first to fifth inventions.

A seventh invention provides the heat-ray shielding dispersion body according to the sixth invention, wherein the medium is resin or glass.

An eighth invention provides the heat-ray shielding dispersion body according to the sixth invention, wherein the medium is one kind or more selected from polyethylene resins, polyvinyl chloride resin, polyvinylidene chloride resins, polyvinyl alcohol resins, polystyrene resins, polypropylene resins, ethylene-vi acetate copolymer, polyester resin polyethylene terephthalate resin, fluorine resin, polycarbonate resin, acrylic resin, and polyvinyl butyral resin.

A ninth invention provides a heat-ray shielding body, wherein the heat-ray shielding dispersion body of any one of the sixth to eighth inventions is provided on one surface or both surfaces of a specific base material.

A tenth invention provides the heat-ray shielding body according to the ninth invention, wherein the heat-ray body is formed into a plate shape or a film shape or 1 thin film shape.

An eleventh invention provides the heat ray shielding body of the ninth or tenth invention, wherein the base material is made of resin or glass.

A twelfth invention provides the heat-ray shielding body of any one of the ninth to eleventh inventions, wherein the base material is made of one kind or more selected from polyethylene resins, polyvinyl chloride resins, polyvinylidene chloride resins, polyvinyl alcohol resins, polystyrene resins, polypropylene resins, ethylene-vinyl acetate copolymer, polyester resin, polyethylene terephthalate resin, fluorine resin, polycarbonate resin, acrylic resin, and polyvinyl butyral resin.

A thirteenth invent ion provides the heat ray shielding body of any one of the ninth to twelfth inventions, wherein when a visible light transmittance is 70% more and a solar transmittance is 40% or less, variation of the visible light transmittance is 2% or less, variation of the solar transmittance is 4% or less, and variation of a haze value is 0.5% or less in a heat-ray shielding dispersion body after evaluation of a hygrothermal resistance.

A fourteenth invention provides a method for producing a heat-ray shielding body, including: coating a surface of a specific base material with the first dispersed mixture liquid of the first or the third invention.

A fifteenth invent ion provides a method for producing a heat-ray shielding body, including: providing a molded solidified material of the second dispersed mixture of the second or the fourth invention, on a specific base material.

A sixteenth invention provides a method for producing a heat-ray shielding body, including: providing a molded solidified material which is a mixture of the second composite tungsten oxide particle dispersion and the second zinc hydroxide particle dispersion of claim 5, on a specific base material.

A seventeenth invention provides the method for producing a heat-ray shielding body of any one of the fourteenth to the sixteenth inventions, wherein the base material is made of resin or glass.

An eighteenth invention provides the method for producing a heat-ray shielding body of any one of the fourteenth to seventeenth inventions, wherein the base material is one kind or more selected from polyethylene resins, polyvinyl chloride resins, polyvinylidene chloride resins, polyvinyl alcohol resins, polystyrene resins, polypropylene resins, ethylene-vinyl acetate copolymer, polyester resin, polyethylene terephthalate resin, fluorine resin, polycarbonate resin, acrylic resin, and polyvinyl butyral resin.

Advantage of the Invention

The present invention provides a heat-ray shielding dispersion body and a heat-ray shielding body, capable of exhibiting excellent hygrothermal resistance compared with a heat-ray shielding dispersion body and a heat-ray shielding body of a conventional technique, and having high transparency even after exposed to a high temperature and humidity, thus suppressing a reduction of a near-infrared ray absorbing function.

BRIEF DESCRIPTION OF THE DRAWINGS

FIG. 1 is a schematic sectional view of a heat-ray shielding dispersion body and a heat-ray shielding body according to the present invention.

DETAILED DESCRIPTION OF THE INVENTION

The present invention provides a heat-ray shielding dispersion body capable of exhibiting excellent hygrothermal resistance, and having high transparency even after exposed to a high temperature and humidity, thus suppressing a reduction of a near-infrared ray absorbing function, and a heat-ray shielding body having the heat-ray shielding dispersion body on one surface or both surfaces of a specific base material, and a method for producing the heat-ray shielding dispersion body and the heat-ray shielding body.

The hygrothermal resistance of the present invention shows suppressing a deterioration such as reduction of the visible light transmittance, rise of the solar transmittance, and rise of the haze value, after the heat-ray shielding dispersion body or the heat-ray shielding body is exposed to a high temperature and humidity condition of 85° C. and 90% RH for example, compared with a case before the exposure. Namely, shows that the heat-ray t aiding dispersion body or the heat ray shielding body has durability against the high temperature and humidity condition.

Detailed explanation is given hereafter for (1) Composite tungsten oxide particle, (2) Zinc hydroxide, (3) Mixture of the composite tungsten oxide particle and the zinc hydroxide particle, (4) Heat-ray shielding dispersion body and its formation, (5) Forms of the heat-ray shielding dispersion body and the heat-ray shielding body, and (6) Conclusion, in this order.

(1) Composite Tungsten Oxide Particle

It is generally known that due to plasma oscillation, a material containing free electrons show a reflection/absorption response to electromagnetic waves that exist around a region of a solar light having a wavelength range of 200 nm to 2600 nm. If powder of such a substance contains particles with smaller wavelengths than those of light, geometric scattering in the visible light region (wavelength range of 380 nm to 780 nm) is reduced, and transparency in the visible light region can be obtained.

Generally, since there are no effective free electrons in $WO_3$, $WO_3$ has small reflection/absorption property in the near-infrared region, and is not effective as a near-infrared ray absorption material. Meanwhile, tungsten trioxide with oxygen deficiency, and tungsten bronze obtained by adding the tungsten trioxide with a positive element such as Na, etc., is a conductive material and a material having free electrons. Further, the response of the free electrons to the light in the near-infrared region is also suggested in the result of analyzing a single crystal, etc., of these materials. The inventors of the present also get a knowledge that when a composition range of the tungsten and oxygen is set in a specific range, $WO_3$ is particularly effective as the near-infrared ray absorption material.

The particles having the near-infrared ray absorbing function according to the present invention, are composite tungsten oxide particles shown by a general formula $M_YWO_Z$ ($0.001 \leq Y \leq 1.0$, $2.2 \leq Z \leq 3.0$), having a hexagonal crystal structure. When applied to a heat-ray shielding dispersion body and a heat-ray shielding body, the composite tungsten oxide particles function effectively as a heat-ray absorption component.

For example, the composite tungsten oxide particles in which element M contains one kind or more of Cs, Rb, K, and Tl, can be given as the composite tungsten oxide particles shown by a general formula $M_YWO_Z$ ($0.001 \leq Y \leq 1.0$, $2.2 \leq Z \leq 3.0$) and having a hexagonal crystal structure. An addition amount of the element M is preferably 0.1 or more and 0.5 or less, and further preferably in the vicinity of 0.33. This is because the value theoretically calculated from the hexagonal crystal structure is 0.33, and a preferable optical property can be obtained by an addition amount of around 0.33. As a typical example, $Cs_{0.33}WO_3$, $Rb_{0.33}WO_3$, $K_{0.33}WO_3$, and $Tl_{0.33}WO_3$, etc., can be given. However, if Y and Z fall within the abovementioned range, a useful heat-ray shielding absorption property can be obtained.

Further, if designs of the heat-ray shielding dispersion body and the heat-ray shielding body are taken into consideration, near-infrared rays can be efficiently shielded while maintaining the transparency. Meanwhile, the near-infrared ray absorption material containing the composite tungsten oxide particles of the present invention have a large light absorption in the near-infrared region, particularly in the vicinity of the wavelength range of 900 to 2200 nm, and therefore, the transmission color range is blue to green in many cases.

Further, when the dispersed particle size of the composite tungsten oxide particles is larger than 800 nm, the visible light is shielded. Therefore, it is difficult to efficiently shield the near-infrared light while maintaining the transparency in the visible light region. Particularly, when the transparency in the visible light region is emphasized, the dispersed particle size is preferably 200 nm or less, and more preferably 100 nm or less. If the dispersed particle size of each particle is large, the light in the visible light region in the wavelength range of 400 to 780 nm is scattered by geometric scattering or diffractive scattering, thus making the glass frosty, and making it difficult to obtain a clear transparency. If the dispersed particle size is 200 nm or less, the abovementioned scattering is reduced, and Mie scattering region or Rayleigh scattering region is created. Particularly, if the dispersed particle size is reduced to the Rayleigh scattering region, scattered lights are reduced in inverse proportion to the sixth power of the dispersed particle size, and therefore scattering is also reduced with reduction of the dispersed particle size, and the transparency is improved. Further, if the dispersed particle size is 100 nm or less, generation of the scattered light is extremely small, and this is preferable. From a viewpoint of preventing scattering of the light, dispersed particle size is preferably small, and if the dispersed particle size is 1 nm or more, industrial production is facilitated.

Further, the heat-ray absorption power per unit weight of the composite tungsten oxide particles is extremely high, and its effect can be exhibited by a use amount of about ¼ to 1/10, compared with ITO (indium tin oxide) and ATO (antimony tin oxide).

(2) Zinc Hydroxide

Zinc hydroxide according to the present invention is added for the purpose of improving the hygrothermal resistance of the heat-ray shielding dispersion body and the heat-ray shielding body, and suppressing the variation of the optical properties in the case that it is used for a long time.

Although zinc hydroxide can be produced by a publicly-known method, a commercially available one can also be used. If purity is 95% or more, it is preferable.

Further, when the dispersed particle size of the zinc hydroxide particle is larger than 800 nm similarly to the case of the abovementioned composite tungsten oxide particle, the visible light is shielded, and therefore it is difficult to efficiently shield the near-infrared light while maintaining the transparency in the visible light region. Particularly, when the transparency in the visible light region is emphasized, the dispersed particle size is preferably 200 nm or less, and more preferably 100 nm or less. If the dispersed particle size is 100 nm or less, generation of the scattered light is extremely small, and this is preferable. From a viewpoint of preventing scattering of the light, dispersed particle size is preferably small, and if the dispersed particle size is 1 nm or more, industrial production is facilitated.

(3) Mixture of the Composite Tungsten Oxide Particles and the Zinc Hydroxide Particles By mixing the composite tungsten oxide particles and the zinc hydroxide particles, an effect of improving the hygrothermal resistance can be obtained while maintaining the optical properties and color tone of the heat-ray shielding dispersion body and the heat-ray shielding body of the present invention.

Meanwhile, when the composite tungsten oxide particles and the zinc hydroxide particles are separately set as dispersion bodies, and these separate dispersion bodies are adhered to each other as separate layers, the improvement of the hygrothermal resistance cannot be observed.

A mixture ratio of the composite tungsten oxide particles and the zinc hydroxide particles is preferably set in a range of 0.1 pts.wt. to 100 pts.wt. of the zinc hydroxide particles, based on 100 pts.wt. of the composite tungsten oxide particles, and is more preferably in a range of 1 pts.wt. to 50 pts.wt. If the addition amount of the zinc hydroxide particles falls in the abovementioned range, there is an effect of improving the hygrothermal resistance of the composite tungsten oxide particles, and there is no influence on the mechanical properties and optical properties of the produced heat-ray shielding dispersion body and the heat-ray shielding body.

Specific explanation is given for a method for mixing the composite tungsten oxide particles and the zinc hydroxide particles, with reference to the following <1> to <4>.

<1> Method for mixing and stirring a composite tungsten oxide particle dispersion liquid and a zinc hydroxide particle dispersion liquid in which particles are previously set to a specific dispersed particle size using a medium stirring mill, etc.

<2> Method for charging a suitable dispersion medium and a medium stirring mill, etc., with the composite tungsten oxide particles and the zinc hydroxide particles after mixing them, and simultaneously performing mixture/stirring of both particles and setting the dispersed particle size.

<3> Method for dispersing the composite tungsten oxide particles and the zinc hydroxide particles in a specific medium.

<4> Method for producing a master batch in which the composite tungsten oxide particles and the zinc hydroxide particles are previously dispersed in a source resin in a high concentration, and using the master batch by diluting it at a specific concentration by mixing the master batch and suitable resin.

The dispersion medium of the composite tungsten oxide particles and the zinc hydroxide particles according to the abovementioned <1> and <2>, are not particularly limited, and can be selected according to the resin mixed when producing the heat-ray shielding dispersion body and the heat-ray shielding body described later. As the dispersion medium, for example, various organic solvents including water, alcohols such as ethanol, propanol, butanol, isopropyl alcohol, isobutyl alcohol, and diacetone alcohol, ethers such as methyl ether, ethyl ether, propyl ether, esters, ketones such as acetone, methyl ethyl ketone, diethyl ketone, cyclohexanone, and methyl isobutyl ketone, can be used. Also, pH may be adjusted by adding acid or alkali as needed. Further, in order to further improve a dispersion stability of the particles, various kinds of surface active agents and coupling agents can also be added.

The method for mixing the composite tungsten oxide particles and the zinc hydroxide particles according to the abovementioned <3> and <4> is the method for directly producing the heat-ray shielding dispersion body and the heat-ray shielding body described later, by mixing the composite tungsten oxide particles and the zinc; hydroxide particles into suitable resin.

In the method of the abovementioned <3>, when the composite tungsten oxide particles and the zinc hydroxide particles singularly dispersed respectively, or the mixture of them is dispersed in the medium, the particles may be singularly permeated or the mixture of them may be permeated from the surface of the medium, or the following method can also be used: namely, the composite tungsten oxide particles and the zinc hydroxide particles may be singularly or the mixture of them may be directly added into thermoplastic resin heated to a melting temperature or more and set in a melted state, which is then uniformly melted and mixed. The method for dispersing the abovementioned both particles in the resin, is not particularly limited, and for example, ultrasonic dispersion, a medium stirring mill, a ball mill, and a sand mill, etc., can be used. By the dispersion processing using these equipment, pulverized particles are increased by collision, etc., of the particles simultaneously with dispersion of both particles in the dispersion medium, thus making the particles finer and more dispersed (namely, the particles are subjected to pulverization and dispersion).

The method for producing a master batch according to the method of <4>, is not particularly limited, and for example, the dispersion liquid of the composite tungsten oxide particles, the dispersion liquid of the zinc hydroxide particles, powder particles or pellet of the thermoplastic resin, and optionally other additive agent, may be uniformly mixed and melted while removing the dispersion medium, to thereby prepare a mixture in which the particles are uniformly dispersed in the thermoplastic resin.

At the time of the mixture, mixing machines such as a ribonucleic blender, a tumbler, a Nauta mixer, a Henschel mixer, a super mixer, and a planetary mixer, etc., or kneading machines such as a Banbury mixer, a kneader, a roll, a kneader ruder, a single-screw extruder, and a twin screw extruder, etc., can be used.

Further, for example, the method for Producing a master batch according to the method of <4> may be performed as follows: the composite tungsten oxide particles and the zinc hydroxide particles obtained by the method of <3> singularly or the mixture of them, the powder particles or pellet of the thermoplastic resin, and optionally other additive agent, may be kneaded by a pent-type single or twin screw extruder in a melted state, and processed into a pellet state, to thereby disperse the composite tungsten oxide particles and/or the zinc hydroxide particles in high concentration the resin.

(4) Method for Forming a Heat-Ray Shielding Dispersion Body

Explanation will be given for a method for forming a heat-ray shielding dispersion body produced by the abovementioned "(3) mixture of the composite tungsten oxide particles and the zinc hydroxide particles", with reference to examples of (A) to (D) described below.

(A) The dispersion medium is removed by a publicly-known method, from the dispersion liquid of the composite tungsten oxide particles and the zinc hydroxide particles produced by the abovementioned method of "(3) mixture of the composite tungsten oxide particles and the zinc hydroxide particles <1> and <2>", and the obtained mixture of both particles, and the powder particles or pellet of the thermoplastic resin, and optionally other additive agent, are uniformly mixed and melted, and solidified/molded into the heat-ray shielding dispersion in which particles are uniformly dispersed in the thermoplastic resin, as the heat-ray shielding dispersion body.

(B) The dispersion medium of the dispersion liquid of the composite tungsten oxide particles and the dispersion liquid of the zinc hydroxide particles produced by the method of the abovementioned "(3) mixture of the composite tungsten oxide particles and the zinc hydroxide particles <1> and <2>", is removed by a publicly-known method, and the obtained mixture of both particles, the powder particles or pellet of the thermoplastic resin, and optionally other additive agent, are uniformly mixed and melted, and solidified/molded into the heat-ray shielding dispersion in which particles are uniformly dispersed in the thermoplastic resin, as the heat-ray shielding dispersion body.

(C) The heat-ray shielding dispersion body which is a thermoplastic resin in which the composite tungsten oxide particles and the zinc hydroxide particles are uniformly dispersed, produced by the abovementioned "(3) mixture of the composite tungsten oxide particles and the zinc hydroxide particles <3> and <4>", is molded into a plate shape, a film shape, and a thin film shape by a specific method, to thereby obtain the heat-ray shielding dispersion body.

(D) The base material is coated with the dispersion liquid of the composite tungsten oxide particles and the zinc hydroxide particles produced by the abovementioned "(3) mixture of the composite tungsten oxide particles and the zinc hydroxide particles <1> to <4>", to thereby obtain the heat-ray shielding dispersion body.

This method can be applied to a material such as resin, etc., having a low heat resistance temperature, and requires no large apparatus in production, thus incurring a low cost.

For example, resin binder is added into the dispersion liquid of the composite tungsten oxide particles and the zinc hydroxide particles produced by the abovementioned "(3) mixture of the composite tungsten oxide particles and the zinc hydroxide particles <1> and <2>", then the surface of the base material is coated with the resin binder, so that the dispersion medium is evaporated, and the resin is solidified by a specific method, to thereby form the dispersion body containing the composite tungsten oxide particles and the zinc hydroxide particles.

Further for example, there is also a method for coating the surface of the base material, with a dispersion in which the composite tungsten oxide particles and the zinc hydroxide particles are directly dispersed in the resin, which is produced by the abovementioned "(3) mixture of the composite tungsten oxide particles and the zinc hydroxide particles <3> and <4>". In this case, there is no necessity for evaporating the dispersion medium, and this is preferable environmentally and industrially.

As a coating method for coating a suitable surface of the base material described later, there is particularly no limit if uniform coating can be performed, and for example, bar coating, gravure coating, spray coating, dip coating, flow coating, spin coating, roll coating, screen printing, and blade coating, etc., can be used. The layer containing the composite tungsten oxide particles formed by these coating methods efficiently absorbs particularly the light in the near-infrared region and simultaneously allows the light to transmit in a visible light region, even if not using an interference effect of the light, compared with a case of producing the layer by dry methods such as sputtering, vapor deposition, ion plating or chemical vapor deposition (CVD method), and a spray method.

In (A) to (D), since the composite tungsten oxide particles are conductive materials, there is a risk of absorbing, reflecting, and interfering radio waves of mobile phones, etc., when the particles are connected to each other to form a continuous film. However, when the composite tungsten oxide particles are dispersed in a matrix as particles by dispersing them using a beads mill for example, radio wave transmittance can be exhibited because each one of the particles is isolated from each other in the case of dispersion, and therefore the heat-ray shielding dispersion body of (A) to (D) has a versatility.

As the medium used in the abovementioned (A) to (D), and as the abovementioned suitable base material, for example, films, resins, and glasses, etc., can be given. However, when these materials are used as the base material, they are required to have a mechanical strength according to each use state.

In a case of the resin, generally transparent colorless resin having transmissivity and less scattering, is suitable and the resin suitable for the purpose of use may be selected. Specifically, polyethylene resin, polyvinyl chloride resin, polyvinylidene chloride resin, polyvinyl alcohol resin, polystyrene resin, polypropylene resin, ethylene-vinyl acetate copolymer, polyester resin, polyethylene terephthalate (PET) resin, fluorine resin, polycarbonate resin, acrylic resin, and polyvinyl butyral resin, etc., can be given. However, above all, polyethylene terephthalate resin is suitable.

Further, when these resins or films are used, surface treatment may be applied to the surface thereof, for the purpose of improving a binding property with a resin binder, and typical treatment methods include a discharge treatment such as a corona surface treatment, a plasma treatment, and a sputtering treatment, and a flame treatment, a metal sodium treatment, and a primer layer coating treatment, etc.

When design of the resins or the films is emphasized, a pre-colored medium or base material, or a molded medium or base material can be used. Further, a coloring pigment or dye may be added into a coating liquid.

Since resin or a film-shaped dispersion body, etc., is attached to the base material such as a glass, etc., an adhesive layer and a release film layer may be laminated on an adhesive surface. A film that can be easily softened by heat of a drier, etc., may be used so as to be easily attached to a curved surface of a rear window of an automobile.

If an ultraviolet screening agent is added into the adhesive agent, ultraviolet deterioration of the films resins can be prevented. An ultraviolet absorber includes a benzophenone ultraviolet absorber, a benzotriazole ultraviolet absorber, $CeO_2$, $TiO_2$, and ZnO, etc.

As the resin binder used for the medium or the base material, which are used in the abovementioned (A) to (D), for example, ultraviolet curable resin, thermosetting resin, electron beam curable resin, cold-setting resin, and thermoplastic resin, etc., can be selected according to the purpose of use. Specifically, thermoplastic resin such as acrylic resin, and thermosetting resin such as epoxy resin, etc., can be used.

Further, an inorganic binder can be used for the medium and the base material which are used in the abovementioned (A) to (D).

The kind of the inorganic binder is not particularly limited. For example, metal alkoxide of silicon, zirconium, titanium, or aluminium, or a partial hydrolyzed condensation polymer of these metal alkoxides or organosilazane can be given as an inorganic binder.

Further, when the metal alkoxide of silicon, zirconium, titanium, aluminium, or a partial hydrolyzed condensation polymer of these metal alkoxides is contained in a coating liquid as the inorganic binder, a polymerization reaction of the alkoxide or the partial hydrolyzed condensation polymer contained in a coating film can be substantially completed by setting a base material heating temperature to 100° C. or more and less than 200° C. after coating using the dispersion liquid. By substantially completing the polymerization reaction, the following situation can be prevented: water or an organic solvent remains in the film, to cause a reduction of a visible light transmittance through the film after heating. Therefore, the heating temperature is preferably 100° C. or more, and further preferably 150° C. or more. If the heating temperature is 200° C. or more, oxidation of the composite tungsten oxide particles is advanced, to cause a loss of the heat-ray shielding power. Accordingly, the heating temperature is preferably less than 200° C.

Further, when the resin binder or the inorganic binder is not contained in the coating liquid, the film formed on the transparent base material has a structure in which only the composite tungsten oxide particles and the zinc hydroxide particles are deposited. Then, such a film shows a heat-ray shielding effect as it is. However, the film is further coated with the coating liquid containing the inorganic binder such as the metal alkoxide of silicon, zirconium, titanium, or aluminium, or the partial hydrolyzed condensation polymer of these metal alkoxides, or the resin binder, so that a multilayer film may be formed. With this structure, gaps in the first layer on which the tungsten oxide particles are deposited, is filled with the components of the coating liquid, thus improving the visible light transmittance by reduction of a haze value of the film, and improving the binding property of the particles with the base material.

(5) Forms of the Heat-Ray Shielding Dispersion Body and the Heat-Ray Shielding Body Explanation will be given next for preferable forms of the heat-ray shielding dispersion body and the heat-ray shielding body of the present invention, with reference to the drawings.

FIG. 1 is a schematic sectional view of the heat-ray shielding dispersion body and the heat-ray shielding body according to this embodiment. In FIG. 1, ○ indicates the composite tungsten oxide particles, ● indicates the zinc hydroxide particles, a plain portion indicates a medium, and a hatched portion indicates the base material.

The heat-ray shielding dispersion body is formed so that both of the composite tungsten oxide particles and the zinc hydroxide particles are contained in the state that they are dispersed in the medium. FIG. 1(A) shows an example of this form. It is of course possible to use a material having a mechanical strength for the medium as the heat-ray shielding body, without using the base material.

The heat-ray shielding body is formed so that the dispersion body containing both of the composite tungsten oxide particles and the zinc hydroxide particles, is provided on one surface or both surfaces of a suitable base material described later, as a molded and solidified material for example. The example of this form is shown in FIG. 1(B).

(6) Conclusion

According to the present invention, there is provided the heat-ray shielding dispersion body and the heat-ray shielding body capable of having an absorption of the near-infrared light from the solar light, which can be produced by a simple method, and which have a hygrothermal resistance and are produced at a low cost. The heat-ray shielding dispersion body and the heat-ray shielding body of the present invention can be used for various purposes of use, for example, the use for vehicle window materials such as automobile inserted glass, side glass and rear glass, and door glass, window glass, and interior door glass of railway vehicles, window glass and interior door glass of buildings, and window materials for buildings such as show window and other indoor exhibition show case.

EXAMPLES

The present invention will be more specifically described hereafter, using examples. However, the present invention is not limited to the following examples.

In these examples, visible light transmittance and a solar light transmittance were measured by a transmittance of a light with a wavelength range of 200 to 2500 nm using a spectrophotometer manufactured by Hitachi Ltd., and calculated according to JIS R 3106. Note that the solar light transmittance is the index showing the heat-ray shielding property of the heat-ray shielding dispersion body and the heat-ray shielding body.

The haze value of the film was measured based on JIS K 7105, using HM-150 manufactured by Murakami Color Research Laboratory Co., Ltd.

The dispersed particle size of each particle was measured using a Microtrac particle size distribution analyzer produced by Nikkiso Inc.

Evaluation of the hygrothermal resistance in the variation of the optical properties of the heat-ray shielding body, was performed by exposing a test sample (heat-ray shielding body) in a thermo-hygrostat bath under environment of 85° C. and 90% RH for 7 days, and measuring the variation of the visible light transmittance, solar transmittance, and haze values before/after an acceleration test of the hygrothermal resistance.

Example 1

20 pts.wt. of $Cs_{0.33}WO_3$ particles, 70 pts.wt. of 4-methyl-2-pentanone as a dispersion medium, and 10 pts.wt. of a dispersant for dispersing particles, were mixed, and a mixture was subjected to dispersion treatment by a medium stirring mill, to thereby prepare a dispersion liquid of $Cs_{0.33}WO_3$ particles having an average dispersed particle size of 80 nm (Liquid A).

Similarly, 20 pts.wt. of zinc hydroxide particles, 70 pts.wt. of 4-methyl-2-pentanone, and 10 pts.wt. of a dispersant for dispersing particles, were mixed, and the mixture was subjected to dispersion treatment by a medium stirring mill, to thereby prepare a dispersion liquid of zinc hydroxide particles having an average dispersed particle size of 80 nm (Liquid B).

Liquid A and liquid B were mixed so that 10 pts.wt. of zinc hydroxide particles were contained based on 100 pts.wt. of $Cs_{0.33}WO_3$ particles, and the mixture was diluted with 4-methyl-2-pentanon and sufficiently mixed so that the ratio of an inorganic binder in this mixed liquid was 30%, to thereby obtain a coating liquid.

The surface of a base material (inorganic glass) was coated with the coating liquid using a bar coater to thereby form a film, and the film thus obtained was dried at 180° C. for 30 minutes so that the dispersion medium was evaporated and cured, to thereby produce the heat-ray shielding body of example 1. Optical properties of the produced heat-ray shielding body are shown in table 1.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured. Results thereof are shown in table 1.

Example 2

20 pts.wt. of $Rb_{0.33}WO_3$ particles, 70 pts.wt. of 4-methyl-2-pentanone as a dispersion medium, and 10 pts.wt. of a dispersant for dispersing particles, were mixed, and a mixture was subjected to dispersion treatment by a medium stirring mill, to thereby prepare a dispersion liquid of $Rb_{0.33}WO_3$ particles having an average dispersed particle size of 80 nm (Liquid C).

Liquid C, and liquid B produced by example 1 were mixed so that 10 pts.wt. of zinc hydroxide particles were contained based on 100 pts.wt. of $Rb_{0.33}WO_3$ particles, and the mixture was diluted with 4-methyl-2-pentanon and sufficiently mixed so that the ratio of an inorganic binder (solid portion: 100%) in this mixed liquid was 30%, to thereby obtain a coating liquid.

The surface of a base material (inorganic glass) was coated with the coating liquid using a bar coater to thereby form a film, and the film thus obtained was dried at 180° C.

for 30 minutes so that the dispersion medium was evaporated and cured, to thereby produce the heat-ray shielding body of example 2. Optical properties of the produced heat-ray shielding body are shown in table 1.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured.

Example 3

20 pts.wt. of $K_{0.33}WO_3$ particles, 70 pts.wt. of 4-methyl-2-pentanone as a dispersion medium, and 10 pts.wt. of a dispersant for dispersing particles, were mixed, and the mixture was subjected to dispersion treatment by a medium stirring mill, to thereby prepare a dispersion liquid of $K_{0.33}WO_3$ particles having an average dispersed particle size of 80 nm (Liquid D).

Liquid D, and liquid B produced by example 1 were mixed so that 10 pts.wt. of zinc hydroxide particles were contained based on 100 pts.wt. of $K_{0.33}WO_3$ particles, and the mixture was diluted with 4-methyl-2-pentanon and sufficiently mixed so that the ratio of an inorganic binder (solid portion: 100%) in this mixed liquid was 30%, to thereby obtain a coating liquid.

The surface of the base material (inorganic glass) was coated with the coating liquid using a bar coater to thereby form a film, and the film thus obtained was dried at 180° C. for 30 minutes so that the dispersion medium was evaporated and cured, to thereby produce the heat-ray shielding body of example 3. Optical properties of the produced heat-ray shielding body are shown in table 1.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured. Results thereof before/after the acceleration test of the hygrothermal resistance, are shown in table 1.

Example 4

20 pts.wt. of $Tl_{0.33}WO_3$ particles, 70 pts.wt. of 4-methyl-2-pentanone as a dispersion medium, and 10 pts.wt. of a dispersant for dispersing particles, were mixed, and a mixture was subjected to dispersion treatment by a medium stirring mill, to thereby prepare a dispersion liquid of $Tl_{0.33}WO_3$ particles having an average dispersed particle size of 80 nm (Liquid E).

Liquid E, and liquid B produced by example 1 were mixed so that 10 pts.wt. of zinc hydroxide particles were contained based on 100 pts.wt. of $Tl_{0.33}WO_3$ particles, and the mixture was diluted with 4-methyl-2-pentanon and sufficiently mixed so that the ratio of an inorganic binder (solid portion: 100%) in this mixed liquid was 30%, to thereby obtain a coating liquid.

The surface of the base material (inorganic glass) was coated with the coating liquid using a bar coater to thereby form a film, and the film thus obtained was dried at 180° C. for 30 minutes so that the dispersion medium was evaporated and cured, to thereby produce the heat-ray shielding body of example 4. Optical properties of the produced heat-ray shielding body are shown in table 1.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured. Results thereof before/after the acceleration test of the hygrothermal resistance, are shown in table 1.

Example 5

20 pts.wt. of $Cs_{0.33}WO_3$ particles, 2 pts.wt. of zinc hydroxide particles, 68 pts.wt. of 4-methyl-2-pentanone as a dispersion medium, and 10 pts.wt. of a dispersant for dispersing particles, were mixed, and the mixture was subjected to dispersion treatment by a medium stirring mill, to thereby prepare a dispersed mixture liquid of $Cs_{0.33}WO_3$/zinc hydroxide particles having an average dispersed particle size of 80 nm (Liquid F).

Liquid F was diluted with 4-methyl-2-pentanon and sufficiently mixed so that the ratio of the inorganic binder (solid portion: 100%) in the liquid F was 30%, to thereby obtain a coating liquid.

The surface of a base material (inorganic glass) was coated with the coating liquid using a bar coater to thereby form a film, and the film thus obtained was dried at 180° C. for 30 minutes so that the dispersion medium was evaporated and cured, to thereby produce the heat-ray shielding body of example 5. Optical properties of the produced heat-ray shielding body are shown in table 1.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured. Results thereof before/after the acceleration test of the hygrothermal resistance, are shown in table 1.

Example 6

The heat-ray shielding body of example 6 was produced similarly to example 1 other than a point that liquid A, and liquid B produced by example 1 were mixed so that 0.1 pts.wt. of zinc hydroxide particles were contained based on 100 pts.wt. of $Cs_{0.33}WO_3$ particles.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured.

Example 7

The heat-ray shielding body of example 7 was produced similarly to example 1 other than a point that liquid A and liquid B produced in example 1 were mixed so that 1 pts.wt. of zinc hydroxide particles were contained based on 100 pts.wt. of $Cs_{0.33}WO_3$ particles. Optical properties of the produced heat-ray shielding body are shown in table 1.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured.

Example 8

The heat-ray shielding body of example 8 was obtained similarly to example 1, other than a point that liquid A and liquid B produced in example 1 were mixed so that 50 pts.wt. of zinc hydroxide particles were contained based on 100 pts.wt. of $Cs_{0.33}WO_3$ particles. Optical properties of the produced heat-ray shielding body are shown in table 1.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured.

Example 9

The heat-ray shielding body of example 9 was obtained similarly to example 1, other than a point that liquid A and liquid B produced in example 1 were mixed so that 100 pts.wt. of zinc hydroxide particles were contained based on 100 pts.wt. of $Cs_{0.33}WO_3$ particles. Optical properties of the produced heat-ray shielding body are shown in table 1.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured.

Example 10

4-methyl-2-pentanone was removed from the liquid A produced in example 1 using a spray drier, to thereby produce a powder A which is a $Cs_{0.33}WO_3$ particle dispersion powder.

Similarly, 4-methyl-2-pentanone was removed from the liquid B produced in example 1 using a spray drier, to thereby produce a powder B which is a zinc hydroxide particle dispersion powder.

The produced powder A was added into polycarbonate resin and uniformly mixed by a blender, and thereafter melted and kneaded by a twin screw extruder, and an extruded strand was cut into a pellet shape, to thereby produce a master batch containing $Cs_{0.33}WO_3$ particles.

Similarly, the produced powder B was added into polycarbonate resin and uniformly mixed by a blender, and thereafter melted and kneaded by a twin screw extruder, and an extruded strand was cut into a pellet shape, to thereby produce a master batch containing zinc hydroxide particles.

The master batch containing the $Cs_{0.33}WO_3$ particles and the master batch containing the zinc hydroxide particles, were mixed with a master batch not added with inorganic particles prepared by the same method, so that 10 pts.wt. of zinc hydroxide particles were contained based on 100 pts.wt. of $Cs_{0.33}WO_3$ particles.

The mixed master batch was extruded and molded so that a plate with a thickness of 2 mm was formed, to thereby produce the heat-ray shielding body of example 10. Optical properties of the heat-ray shielding body are shown in table 1.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured.

Example 11

Liquid F, produced by example 5 was diluted with 4-methyl-2-pentanone and sufficiently mixed, so that the ratio of an inorganic binder (solid portion: 100%) in the liquid F was 30%, to thereby produce a dispersion liquid. The surface of abase material (inorganic glass) was coated with the coating liquid using a bar coater to thereby form a film, and the film thus obtained was dried at 180° C. for 30 minutes so that the dispersion medium was evaporated and cured. Thereafter, the other surface of the base material was also coated with the coating liquid by the same method to thereby form a film and the film was cured, to thereby obtain the heat-ray shielding body of example 11 so that 10 pts.wt. of zinc hydroxide particles were contained based on 100 pts.wt. of $Cs_{0.33}WO_3$ particles. Optical properties of the produced heat-ray shielding body are shown in table 1.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured.

Comparative Example 1

20 pts.wt. of $Cs_{0.33}WO_3$ particles, 70 pts.wt. of 4-methyl-2-pentanone as a dispersion medium, and 10 pts.wt. of a dispersant for dispersing particles, were mixed, and the mixture was subjected to dispersion treatment by a medium stirring mill, to thereby prepare a dispersion liquid of $Cs_{0.33}WO_3$ particles having an average dispersed particle size of 80 nm (Liquid A).

The liquid A was diluted with 4-methyl-2-pentanone, and sufficiently mixed so that the ratio of the inorganic binder (solid portion: 100%) in the liquid A was 30%, to thereby produce a dispersion liquid. The surface of a base material (inorganic glass) was coated with the coating liquid using a bar coater to thereby form a film, and the film thus obtained was dried at 180° C. for 30 minutes so that the dispersion medium was evaporated and cured, to thereby produce the heat-ray shielding body of comparative example 1. Optical properties of the produced heat-ray shielding body are shown in table 1.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured. Results thereof before/after the acceleration test of the hygrothermal resistance, are shown in table 1.

Comparative Example 2

The heat-ray shielding body of comparative example 2 was produced similarly to example 1, other than a point that liquid A and liquid B produced in example 1 were mixed so that 0.01 pts.wt. of zinc hydroxide particles were contained based on 100 pts.wt. of $Cs_{0.33}WO_3$ particles. Optical properties of the produced heat-ray shielding body are shown in table 1.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured.

Comparative Example 3

The heat-ray shielding body of comparative example 3 was produced similarly to example 1, other than that liquid A and liquid B produced in example 1 were mixed so that 200 pts.wt. of zinc hydroxide particles were contained based on 100 pts.wt. of $Cs_{0.33}WO_3$ particles. Optical properties of the produced heat-ray shielding body are shown in table 1.

However, due to excessively large addition amount of the zinc hydroxide particles, the heat-ray shielding body of comparative example 3 involves a problem that the base material and a heat-ray shielding film are easily peeled-off. Therefore, a hygrothermal resistance test was not performed.

Comparative Example 4

Liquid A produced in example 1 was diluted with 4-methyl-2-pentanone, and sufficiently mixed so that the ratio of the inorganic binder (solid portion: 100%) in the liquid A was 30%, to thereby produce a dispersion liquid A.

Similarly, liquid B produced in example 1 was diluted with 4-methyl-2-pentanone, and sufficiently mixed so that the ratio of the zinc hydroxide particles in the liquid B was 30%, to thereby produce a dispersion liquid B.

The surface of a base material (inorganic glass) was coated with the coating liquid using a bar coater to thereby form a film, and the film thus obtained was dried at 180° C. for 30 minutes so that the dispersion medium was evaporated and cured. Thereafter, the surface of the film of the cured dispersion liquid A was further coated with a dispersion liquid B as a coating liquid, to form a film so that 10 pts.wt. of zinc hydroxide particles were contained based on 100 pts.wt. of $Cs_{0.33}WO_3$ particles, which were then cured, to thereby obtain the heat-ray shielding body of comparative example 4. Optical properties of the produced heat-ray shielding body are shown in table 1.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured.

Comparative Example 5

The heat-ray shielding body of comparative example 5 was produced similarly to example 1, other than a point that liquid A produced in example 1 and zinc 2-ethyl hexanoate were mixed so that 10 pts.wt. of the zinc 2-ethyl hexanoate was contained based on 100 pts.wt. of $Cs_{0.33}WO_3$ particles. Optical properties of the produced heat-ray shielding body are shown in table 1.

The heat-ray shielding body thus produced was used as a test sample, and exposed under environment of 85° C. and 90% RH for 7 days, and the variation of the visible light transmittance, solar transmittance, and haze values before/after an acceleration test of the hygrothermal resistance, were measured.

(Evaluation)

In examples 1 to 11, the heat-ray shielding body having high visible light transmittance, excellent heat-ray shielding property, a low haze value, and excellent transparency, could be obtained. Also, by adding the zinc hydroxide particles, aging deterioration of the composite tungsten oxide particles exposed under high temperature high humidity condition could be suppressed, and high hygrothermal resistance could be exhibited, with less variation of the optical properties. As a result, the heat-ray shielding body with less variation of the heat-ray shielding properties even under a severe use condition like outdoor, could be obtained.

Meanwhile, in comparative examples 1 to 2, zinc hydroxide particles were not added, or an addition amount was excessively small even if it was added, and therefore a large variation of the visible light transmittance was found in the hygrothermal resistance test.

Further, in comparative example 3, due to excessively large addition amount of the zinc hydroxide particles, adhesion to the base material (inorganic glass) was damaged, although it is an important physical property of the heat-ray shielding body.

Further, in comparative example 4, since the $Cs_{0.33}WO_3$ particles and the zinc hydroxide particles were not contained in the same layer, the hygrothermal resistance of the $Cs_{0.33}WO_3$ particles was not improved at all.

Further in comparative example 5, not the zinc hydroxide particles, but the zinc 2-ethyl hexanoate was used, and therefore a large variation of the haze values was found in the hygrothermal resistance test.

TABLE 1

| | | Initial property | | | Before/after hygrothermal resistance test | | |
|---|---|---|---|---|---|---|---|
| | Kind and ratio of a solid portion of particles | Visible light transmittance (%) | Solar transmittance (%) | Raze (%) | ΔVisible light transmittance (%) | ΔSolar transmittance (%) | ΔRaze (%) |
| Example 1 | $Cs_{0.33}WO_3$:Zn$(OH)_2$ = 100:10 | 71.5 | 36.9 | 0.9 | 1.0 | 1.2 | 0.1 |
| Example 2 | $Rb_{0.33}WO_3$:Zn$(OH)_2$ = 100:10 | 71.2 | 36.8 | 1.0 | 1.2 | 1.3 | 0.0 |
| Example 3 | $K_{0.33}WO_3$:Zn$(OH)_2$ = 100:10 | 72.5 | 37.6 | 1.0 | 1.7 | 1.5 | 0.1 |
| Example 4 | $Tl_{0.33}WO_3$:Zn$(OH)_2$ = 100:10 | 72.4 | 37.7 | 0.9 | 1.4 | 1.3 | 0.0 |
| Example 5 | $Cs_{0.33}WO_3$:Zn$(OH)_2$ = 100:10 | 73.5 | 38.1 | 0.8 | 0.9 | 1.2 | 0.1 |
| Example 6 | $Cs_{0.33}WO_3$:Zn$(OH)_2$ = 100:0.1 | 74.4 | 39.0 | 0.8 | 1.8 | 1.5 | 0.0 |
| Example 7 | $Cs_{0.33}WO_3$:Zn$(OH)_2$ = 100:1 | 73.6 | 38.3 | 0.8 | 1.7 | 1.5 | 0.1 |
| Example 8 | $Cs_{0.33}WO_3$:Zn$(OH)_2$ = 100:50 | 71.0 | 36.4 | 1.0 | 0.8 | 1.0 | 0.2 |
| Example 9 | $Cs_{0.33}WO_3$:Zn$(OH)_2$ = 100:100 | 70.8 | 36.1 | 1.0 | 0.8 | 1.0 | 0.2 |

TABLE 1-continued

|  | Kind and ratio of a solid portion of particles | Initial property | | | Before/after hygrothermal resistance test | | |
|---|---|---|---|---|---|---|---|
|  |  | Visible light transmittance (%) | Solar transmittance (%) | Raze (%) | ⊿Visible light transmittance (%) | ⊿Solar transmittance (%) | ⊿Raze (%) |
| Example 10 | $Cs_{0.33}WO_3$:Zn $(OH)_2$ = 100:10 | 73.3 | 38.1 | 0.9 | 1.0 | 1.1 | 0.1 |
| Example 11 | $Cs_{0.33}WO_3$:Zn $(OH)_2$ = 100:10 | 72.9 | 37.9 | 0.9 | 1.1 | 1.2 | 0.0 |
| Comparative example 1 | $Cs_{0.33}WO_3$:Zn $(OH)_2$ = 100:0 | 70.9 | 36.1 | 0.8 | 3.5 | 6.0 | 0.1 |
| Comparative example 2 | $Cs_{0.33}WO_3$:Zn $(OH)_2$ = 100:0.01 | 74.1 | 38.8 | 0.8 | 4.2 | 7.4 | 0.0 |
| Comparative example 3 | $Cs_{0.33}WO_3$:Zn $(OH)_2$ = 100:200 | 71.1 | 3.3 | 1.1 | Unable to be tested | Unable to be tested | Unable to be tested |
| Comparative example 4 | $Cs_{0.33}WO_3$:Zn $(OH)_2$ = 100:10* | 72.0 | 37.5 | 1.0 | 4.4 | 7.6 | 0.1 |
| Comparative example 5 | $Cs_{0.33}WO_3$:Zn $[OOCCH(C_2H_6)C_4H_9]_2$ = 100:10 | 71.2 | 36.5 | 1.0 | 1.6 | 2.0 | 1.3 |

*Two-layer structure of $Cs_{0.33}WO_3$ particle layer and zinc hydroxide particle layer

The invention claimed is:

1. A method for producing a heat-ray shielding dispersion body, comprising:
   producing a composite tungsten oxide particle dispersion liquid in which composite tungsten oxide particles are dispersed in a dispersion medium, each particle being expressed by a general formula $M_YWO_Z$ ($0.001 \leq Y \leq 1.0$, $2.2 \leq Z \leq 3.0$) wherein element M is one or more kinds of Cs, Rb, K, Tl, and having a hexagonal crystal structure, with a particle size of 1 nm or more and 800 nm or less;
   producing a zinc hydroxide particle dispersion liquid by dispersing zinc hydroxide in a dispersion medium, with a dispersed particle size of the zinc hydroxide set to 1 nm or more and 800 nm or less;
   producing a first dispersed mixture liquid by adding and mixing the zinc hydroxide particle dispersion liquid into the composite tungsten oxide particle dispersion liquid, so that not less than 0.1 pts.wt. and not more than 100 pts.wt. of the zinc hydroxide particles are contained, based on 100 pts.wt. of the composite tungsten oxide particles; and
   producing a heat-ray shielding dispersion body by molding and solidifying the first dispersed mixture liquid.

2. The method for producing a heat-ray shielding dispersion body according to claim 1, comprising:
   producing a dispersion powder by removing the dispersion medium from the first dispersed mixture liquid; and
   producing a second dispersed mixture by mixing and dispersing the dispersion powder in a specific medium; and
   producing a heat-ray shielding dispersion body by molding and solidifying the second dispersed mixture.

3. A method for producing a heat-ray shielding dispersion body, comprising:
   producing a first dispersed mixture liquid in which composite tungsten oxide particles are dispersed in a dispersion medium, each particle being expressed by a general formula $M_YWO_Z$ ($0.001 \leq Y \leq 1.0$, $2.2 \leq Z \leq 3.0$) wherein element M is one or more kinds of Cs, Rb, K, Tl, having a hexagonal crystal structure, and also zinc hydroxide particles are dispersed therein, with a particle size of the composite tungsten oxide particles and the zinc hydroxide particles set to 1 nm or more and 800 nm or less, so that 0.1 pts.wt. or more and 100 pts.wt. or less of the zinc hydroxide particles are contained based on 100 pts.wt. of the composite tungsten oxide particles; and
   producing a heat-ray shielding dispersion body by molding and solidifying the first dispersed mixture liquid.

4. The method for producing a heat-ray shielding dispersion body according to claim 3, comprising:
   producing a dispersion powder by removing the dispersion medium from the first dispersed mixture liquid;
   producing a second dispersed mixture by mixing and dispersing the dispersion powder in a specific medium; and
   producing a heat-ray shielding dispersion body by molding and solidifying the second dispersed mixture.

5. A method for producing a heat-ray shielding dispersion body, comprising:
   producing a first composite tungsten oxide particle dispersion liquid in which composite tungsten oxide particles are dispersed in a dispersion medium, each particle being expressed by a general formula $M_YWO_Z$ ($0.001 \leq Y \leq 1.0$, $2.2 \leq Z \leq 3.0$) wherein element M is one or more kinds of Cs, Rb, K, Tl, and having a hexagonal crystal structure, with a particle size of 1 nm or more and 800 nm or less;
   producing a composite tungsten oxide particle dispersion powder by removing the dispersion medium from the first composite tungsten oxide particle dispersion liquid;
   producing a second composite tungsten oxide particle dispersion by mixing and dispersing the composite tungsten oxide particle dispersion powder in a specific medium;
   producing a first zinc hydroxide particle dispersion liquid by dispersing zinc hydroxide in a dispersion medium, with a dispersed particle size of the zinc hydroxide set to 1 nm or more and 800 nm or less, and producing a zinc hydroxide particle dispersion powder by removing the dispersion medium from the dispersion liquid of the first zinc hydroxide particle dispersion liquid;
   producing a second zinc hydroxide particle dispersion by mixing and dispersing the zinc hydroxide particle dispersion powder in a specific medium; and
   producing a heat-ray shielding dispersion body by mixing the second composite tungsten oxide particle dispersion and the second zinc hydroxide particle dispersion, and molding and solidifying them wherein the total amount of zinc hydroxide particles is not less than not less than 0.1 pts. wt. and not more than 100 pts. wt. based on 100 pts. wt. of the composite tungsten oxide particles.

6. A heat-ray shielding dispersion body comprising:
composite tungsten oxide particles expressed by a general formula $M_YWO_Z$ ($0.001 \leq Y \leq 1.0$, $2.2 \leq Z \leq 3.0$) wherein element M is one or more of Cs, Rb, K, Tl, and having a hexagonal crystal structure, with an average dispersed particle size of 1 nm or more and 800 nm or less;
zinc hydroxide particles with an average dispersed particle size of the zinc hydroxide set to 1 nm or more and 800 nm or less;
a medium;
wherein not less than 0.1 pts.wt. and not more than 100 pts.wt. of the zinc hydroxide particles are contained, based on 100 pts.wt. of the composite tungsten oxide particles,
the composite tungsten oxide particles, zinc hydroxide particles, and the medium are mixed in one layer, and
the heat-ray shielding dispersion body has a near-infrared ray absorbing function and exhibits radio wave transmittance.

7. The heat-ray shielding dispersion body according to claim 6, wherein the medium is resin or glass.

8. The heat-ray shielding dispersion body according to claim 6, wherein the medium is one or more selected from the group consisting of polyethylene resins, polyvinyl chloride resins, polyvinylidene chloride resins, polyvinyl alcohol resins, polystyrene resins, polypropylene resins, ethylene-vinyl acetate copolymer, polyester resin, polyethylene terephthalate resin, fluorine resin, polycarbonate resin, acrylic resin, and polyvinyl butyral resin.

9. A heat-ray shielding body, wherein the heat-ray shielding dispersion body of claim 6 is provided on one surface or both surfaces of a base material.

10. The heat-ray shielding body according to claim 9, wherein the heat-ray shielding body is formed into a plate shape or a film shape ora thin film shape.

11. The heat-ray shielding body according to claim 9, wherein the base material is made of resin or glass.

12. The heat-ray shielding body according to claim 9, wherein the base material is made of one or more selected from the group consisting of polyethylene resins, polyvinyl chloride resins, polyvinylidene chloride resins, polyvinyl alcohol resins, polystyrene resins, polypropylene resins, ethylene-vinyl acetate copolymer, polyester resin, polyethylene terephthalate resin, fluorine resin, polycarbonate resin, acrylic resin, and polyvinyl butyral resin.

13. The heat-ray shielding body according to claim 9, wherein when a visible light transmittance is 70% or more and a solar transmittance is 40% or less, variation of the visible light transmittance is 2% or less, variation of the solar transmittance is 4% or less, and variation of a haze value is 0.5% or less in the heat-ray shielding dispersion body after evaluation of a hygrothermal resistance.

* * * * *